United States Patent
Frazier

(10) Patent No.: US 6,276,359 B1
(45) Date of Patent: Aug. 21, 2001

(54) DOUBLE REFLECTING SOLAR CONCENTRATOR

(76) Inventor: Scott Frazier, 107617 Robin Creek La., Frisco, TX (US) 75035

(*) Notice: Subject to any disclaimer, the term of this patent is extended or adjusted under 35 U.S.C. 154(b) by 0 days.

(21) Appl. No.: 09/579,537

(22) Filed: May 24, 2000

(51) Int. Cl.$^7$ .................. F24J 2/06; F24J 3/02
(52) U.S. Cl. .............. 126/686; 126/685; 126/692; 126/694
(58) Field of Search .................. 126/681, 684, 126/685, 686, 687, 692, 693, 694, 695, 690, 680; 359/852, 853, 857

(56) References Cited

U.S. PATENT DOCUMENTS

| | | |
|---|---|---|
| 820,127 | 5/1906 | Pope . |
| 3,171,403 | 3/1965 | Drescher ................. 126/270 |
| 3,295,512 | 1/1967 | McCusker .............. 126/270 |
| 3,923,039 * | 12/1975 | Falbel . |
| 3,988,166 | 10/1976 | Beam ..................... 136/89 |
| 3,991,740 * | 11/1976 | Rabi . |
| 4,088,116 * | 5/1978 | Pastor . |
| 4,099,516 * | 7/1978 | Caulier . |
| 4,132,219 * | 1/1979 | Cohen et al. . |
| 4,235,224 * | 11/1980 | Yarwood et al. . |
| 4,274,397 * | 6/1981 | Hill ....................... 126/685 |
| 4,280,480 * | 7/1981 | Raposo . |
| 4,287,880 * | 9/1981 | Geppert . |
| 4,290,418 | 9/1981 | Uroshevich ............ 126/439 |
| 4,312,329 | 1/1982 | Carver et al. ......... 126/439 |
| 4,408,595 | 10/1983 | Broyles et al. ........ 126/424 |
| 4,444,176 * | 4/1984 | Hanson . |
| 4,444,468 | 4/1984 | Mori ..................... 350/294 |
| 4,590,920 | 5/1986 | Sainsbury .............. 126/425 |
| 4,784,700 | 11/1988 | Stern et al. ............ 136/248 |
| 4,841,946 | 6/1989 | Marks .................... 126/451 |
| 4,864,317 | 9/1989 | Sorko-Ram ........... 343/720 |
| 5,365,920 | 11/1994 | Lechner ................ 126/696 |
| 5,546,097 | 8/1996 | Ramanujam et al. ... 343/781 |
| 5,907,442 | 5/1999 | Matsuda ................ 359/858 |

FOREIGN PATENT DOCUMENTS

| | | | |
|---|---|---|---|
| 356149551 * | 11/1981 | (JP) | ........ 126/690 |
| 14497784 * | 1/1989 | (SU) | ........ 126/690 |

OTHER PUBLICATIONS

G. Sala et al; Instituto de Energia Solar. Universidad Politecnica de Madrid 28040 Madrid; *The Euclides* Protype: An efficient parabolic trough for PV Concerntration; pp. 1–8; http://www.users.globalnet.co.uk/~blootl/trackers/eucl.htm. Mar. 17, 2000.

\* cited by examiner

*Primary Examiner*—Carl D. Price
(74) *Attorney, Agent, or Firm*—Jenkens & Gilchrist, P.C.

(57) ABSTRACT

A double reflecting solar concentrator utilizing a primary parabolic reflective surface which reflects incident light toward a secondary surface. The incident light reflects off the secondary surface away from the primary parabolic surface's natural focus point toward a secondary focal point positioned on or substantially near the surface of the primary parabolic reflective surface.

18 Claims, 6 Drawing Sheets

Generic Parabola and Focus

Parabolic section of interest

Light reflecting off parabola

Reflecting plane changes the focal point

Reflecting Plane Addition (Close-up)

Possible parabolas w/proper point

Direct Parabolic corner selected to not interrupt other optical path

Direct Parabolic section of interest

Direct Parabolic section of interest

DOUBLE REFLECTING SOLAR CONCENTRATOR

BACKGROUND OF THE INVENTION

1. Technical Field of the Invention

The present invention relates to solar concentrators and solar collector systems. More particularly, the present invention relates to a linear solar concentrator which utilizes a portion of a parabolic arc for a first reflection surface and a planar secondary reflection surface for concentrating solar energy in a substantially linear fashion on a predetermined portion of the first reflection surface.

2. Description of Related Art

Solar concentrators work by collecting sunlight from a large area and concentrating sunlight into a smaller area. There are identifiable techniques for converting solar energy into useable forms, but whether or not the solar energy is collected and converted on a substantial scale is controlled by economics. If the cost of installing and maintaining a solar energy collection system is lower than the alternatives, then widespread use of the solar energy collection system is possible. The bulk of the cost for solar energy collection systems is in the initial investment. Thus, solar systems must begin to pay for themselves when the system is utilized.

Presently, there exist large linear solar concentrators. FIG. 1 depicts an exemplary prior art linear concentrator. The depicted concentrator was the result of the EUCLIDES project which was subsidized by the European Union. Dual parabolic trough portions cast a beam irradiance onto a strip of solar cells positioned linearly along the Dual parabolic trough portion's focal line. Drawbacks of this prior art type of linear concentrator relate to the size and shape of the concentrator as well as the position of the focal line. The geometry of such concentrators requires that the linear trough must "stick-up" high above the ground in order to focus the solar energy to the focal lines of the trough. The parabolic surfaces become a large "sail" and require substantial support due to subjection to the strength of strong winds. The singular parabolic shape of the concentrator is not easily reinforceable and is easily twisted or flexed out of its required parabolic shape such that the reflected solar energy misses the prescribed linear conglomerate of solar cells.

Furthermore, the focal line positioning of the solar collectors requires its own separate supporting structure such that the solar collectors are held on the focal line associated with each parabolic solar concentrator.

Cooling of the solar collectors is a difficult task due to the movement of the focal line as the linear parabolic trough tracks the sun. The focal line will move along a defined arc as the depicted linear parabolic trough collector pivots on a line parallel with the focal line. Such a situation requires flexible plumbing pieces that connect to the solar collection area. The flexible plumbing carries coolant, such as water, to cool the solar collector devices while the solar energy is being concentrated on them. Flexible plumbing tends to crack, degrade and leak when it is used in outdoor conditions. Thus, one of the major repair costs for prior art solar concentrator/collection systems is the repair and maintenance of the associated flexible plumbing for cooling the collector area of the solar concentrator.

What is needed is a solar concentrator configuration that has a relatively low manufacturing cost, that is structurally more rigid than a simple linear parabolic trough, that pivots substantially at the focal line of the linear concentrator to effectively eliminate a substantial need for flexible cooling plumbing, and that maintains a profile close to the ground such that the solar concentrator structure is less likely to sustain damage due to high winds.

SUMMARY OF THE INVENTION

The present invention overcomes the foregoing and other problems by providing a double reflecting linear trough style solar concentrator that is relatively inexpensive to manufacture and provides a structure that is substantially more rigid than a simple parabolic surface.

Exemplary embodiments of the present invention provide a double reflecting solar concentrator that comprises a primary parabolic surface and a secondary planar surface. Incident light reflects off the primary parabolic surface toward the parabolic surface's natural focal line. Prior to reaching the natural focal line, the incident light is reflected off the secondary planar surface toward a secondary focal line which is located substantially on the primary parabolic surface. The optical path results in a narrower field of view at the receiver which can improve the costs of some receiver devices. Th primary reflector also acts to redirect slightly unfocussed sunlight back onto the receiver which reduces system pointing accuracy requirements. Furthermore, this technique for focusing allows the solar concentrator to track the sun by pivoting substantially on the focal line of the exemplary double reflecting trough. A cooling system can cool the solar collectors positioned on the focal line. Since the focal line is substantially stationary, flexible plumbing for cooling the area about the focal line is substantially eliminated.

Furthermore, exemplary solar concentrators that are in accordance with the present invention are structured to comprise a profile that is low to the ground such that wind effects are limited. Such a low profile design eliminates the prior art's need for "beefy" structural support.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PREFERRED EXEMPLARY EMBODIMENTS OF THE PRESENT INVENTION

The exemplary embodiments provide a double reflecting solar concentrator which has useful optical and construction properties which lend itself to low construction costs, installation costs, and operational costs.

The exemplary concentrators geometrically comprise a predetermined portion of a parabolic mirror. A second reflecting surface allows light to be focused on and along a predetermined portion of the surface of the parabolic mirror.

Figure 1:
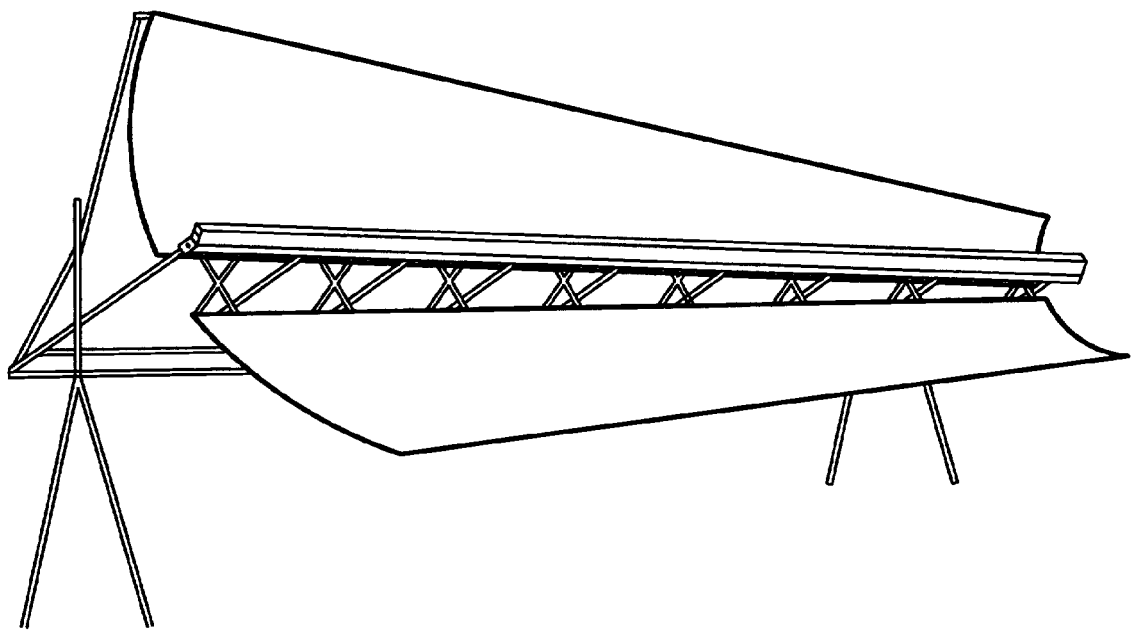
FIG. 1 is a prior art parabolic trough solar concentrator.
Figure 2:
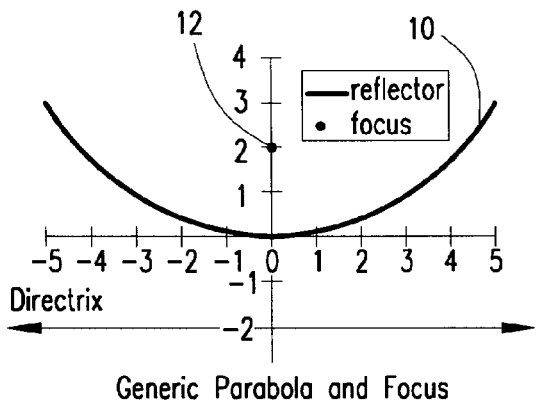
FIG. 2 is a generic parabola and its focus.
Figure 3:
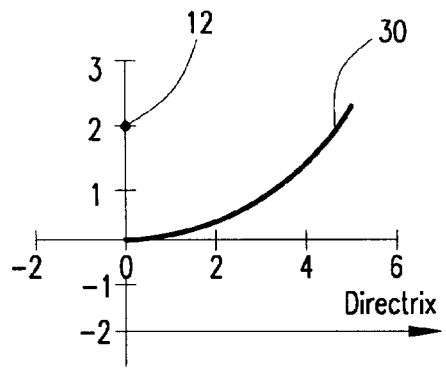
FIG. 3 depicts a section of a parabolic curve.
Figure 4:
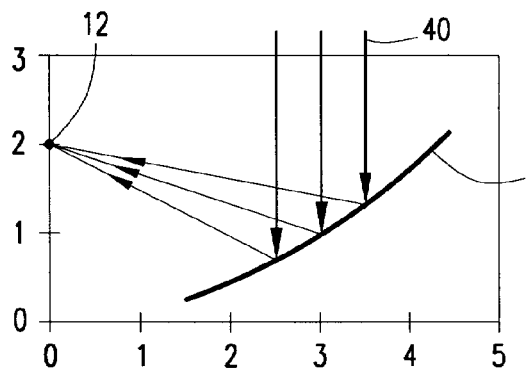
FIG. 4 depicts an exemplary portion of a parabolic curve with light reflecting off of the parabolic surface.

FIG. 2 depicts a traditional generic parabolic shape 10 and focal point 12. A parabola is the set of points, in a plane that are equidistant from a focus point and a line in the plane (the line is sometimes called a directrix). The exemplary embodiments of the present invention utilize a portion of the parabolic arc 10. It is understood that virtually any parabolic arc (parabolic equation) can be utilized in the present invention. FIG. 3 depicts a section of the parabolic arc 30 and its focus 12. FIG. 4 depicts incident light 40 impinging on a surface of the section of parabolic arc 30 and reflecting off a reflective surface (not specifically shown) to the focus 12 of the parabolic arc section 30.

Figure 5:
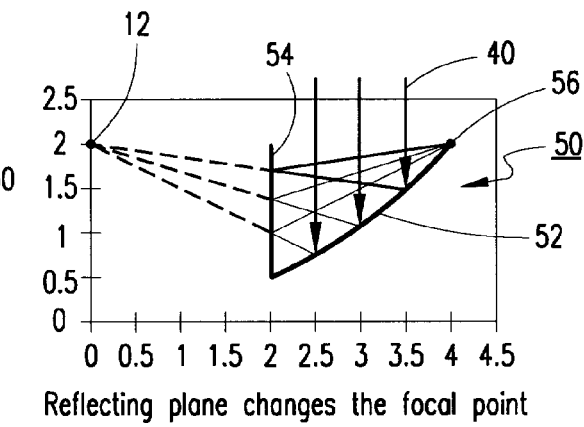
FIG. 5 depicts an exemplary side view of an exemplary double reflecting parabolic solar concentrator.
Figure 6:
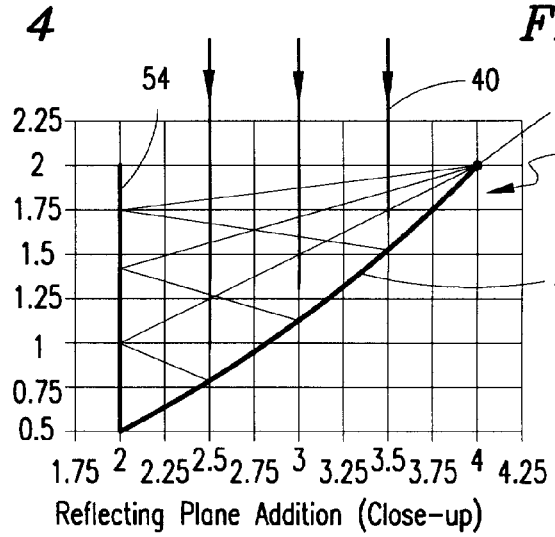
FIG. 6 depicts a closer view of FIG. 5.

FIGS. 5 and 6 depict a first embodiment of the present double reflecting solar concentrator 50. A first reflecting surface 52 comprises a predetermined portion of a parabolic curve 30. A second reflective surface 54 is perpendicular to a directrix associated with the parabolic curve. The exemplary parabolic curve is normalized such that the focal point 12 is positioned at X=0, Y=2 and the second reflective surface is positioned at X=2.

The incident light 40 reflects off the primary surface 52 and proceeds toward the focal point 12. Prior to reaching the focal point 12, the incident light reflects off the secondary surface 54 and is focused at the secondary focus 56. The secondary reflective surface 54, is preferably positioned on the parabolic curve of the primary reflective surface 52. In the exemplary embodiment the primary and secondary focal points 12, 56 are each positioned at the same Y-coordinate position.

By placing the secondary surface 54 between the primary reflective surface 52 (the parabolic curve) and the focus, the secondary surface 54 will shift the focus to a point equally distant in front of it as the distance to the focal point 12 behind it. Therefore, if the secondary surface 54 is put in an X-position that is equal to the Y-position of the focus 12 height, the focus will be shifted to a secondary focus point 56 located on the parabolic curve and the primary reflective surface 52. FIG. 5 depicts the secondary focus 56 to be on the primary surface directly to the right of the focus 12. The incident light 40 that is focused to the secondary focal point 56 must be perpendicular to the directrix of the parabolic curve.

With the understanding that FIG. 6 represents a "normalized" cross section of an exemplary trough-style double reflecting solar concentrator 50, it is plain to see that the secondary focal point 56 is essentially a focal line that extends the length of the exemplary double reflecting concentrator's length. Photovoltaic (PV) cells can be placed linearly along to focal line to collect the solar energy.

Figure 7:
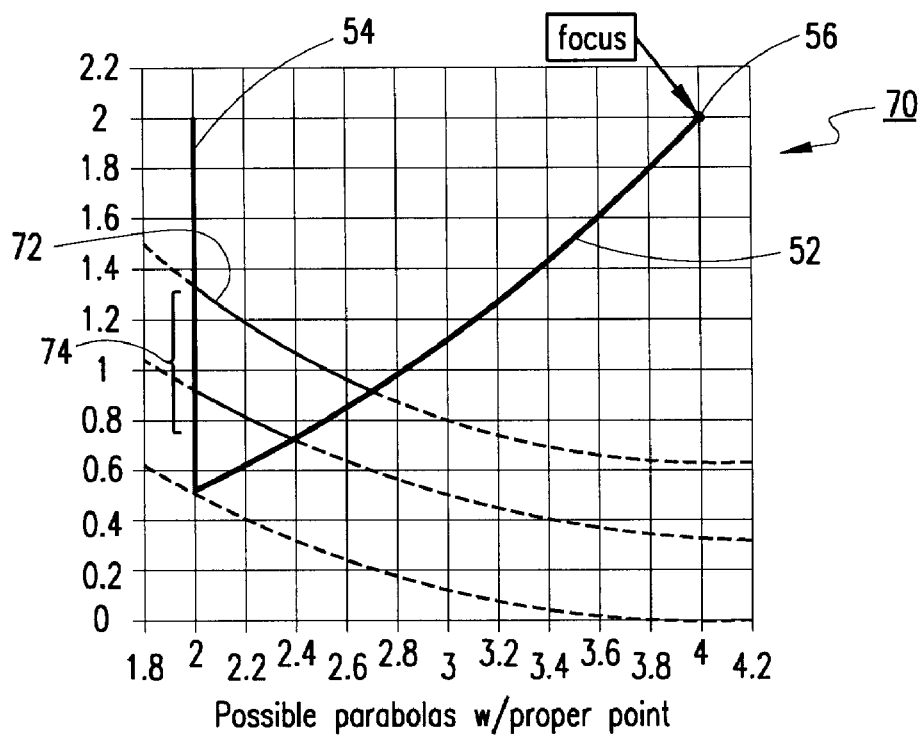
FIG. 7 depicts another exemplary embodiment of a double reflecting solar concentrator comprising a second parabolic surface.
Figure 8:
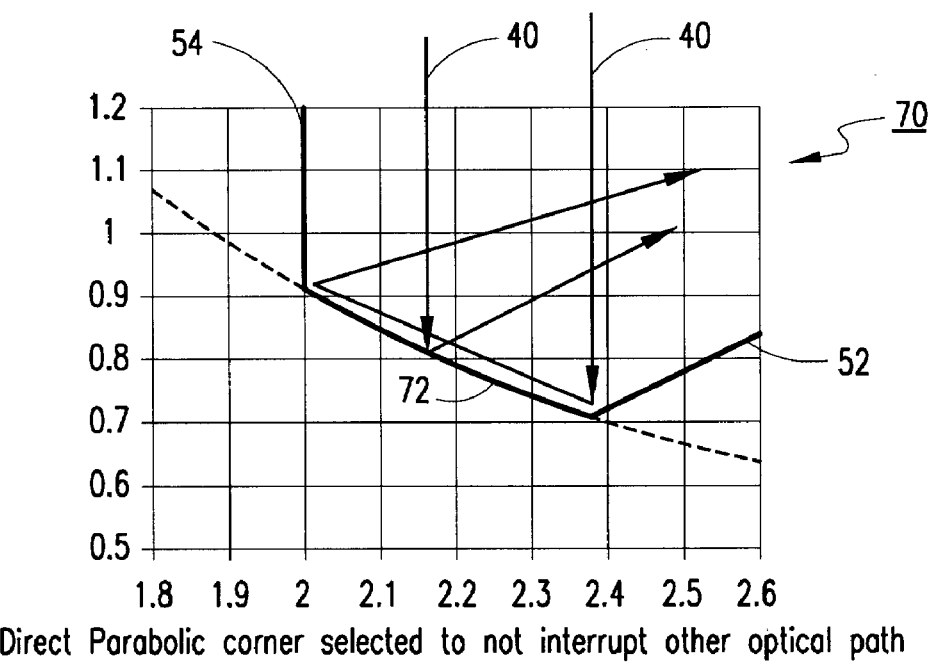
FIG. 8 depicts an exemplary double reflecting solar concentrator with a second parabolic surface and how further depicts light reflects across the second parabolic surface.

FIG. 7 depicts another exemplary embodiment of the present invention. FIG. 7 depicts a double reflecting solar concentrator having two parabolic surfaces 70. This embodiment provides a solar concentrator have a more compact profile then the first exemplary embodiment. A second parabolic reflector 72 is positioned between the primary reflective surface 52 and the secondary reflective surface 54. The second parabolic reflector 72 has a focal point that coincides with the secondary focal point 56. The second parabolic reflector 72 allows the corner 74 to be removed thereby decreasing the overall height of the double reflecting parabolic concentrator 70. FIG. 8 depicts a preferable position for the second parabolic reflector 72. Ideally, the second parabolic reflector 72 is positioned such that it does not interfere with the reflection of incident light 40 as it reflects from the primary surface 52 to the secondary surface 54. In other words, the preferable position for the second parabolic surface 72 is such that light incident on the primary surface 52 is reflected toward the secondary surface 54 without being obscured or reflected by the second parabolic surface 72.

Again, the exemplary embodiment 70 is normalized such that the original focus of the parabolic curve is at X=0, Y=2. One with skill in the art could determine and calculate the positioning of the secondary reflective surface 54 and the second parabolic reflector 72 for a variety of parabolic curves.

Figure 9:
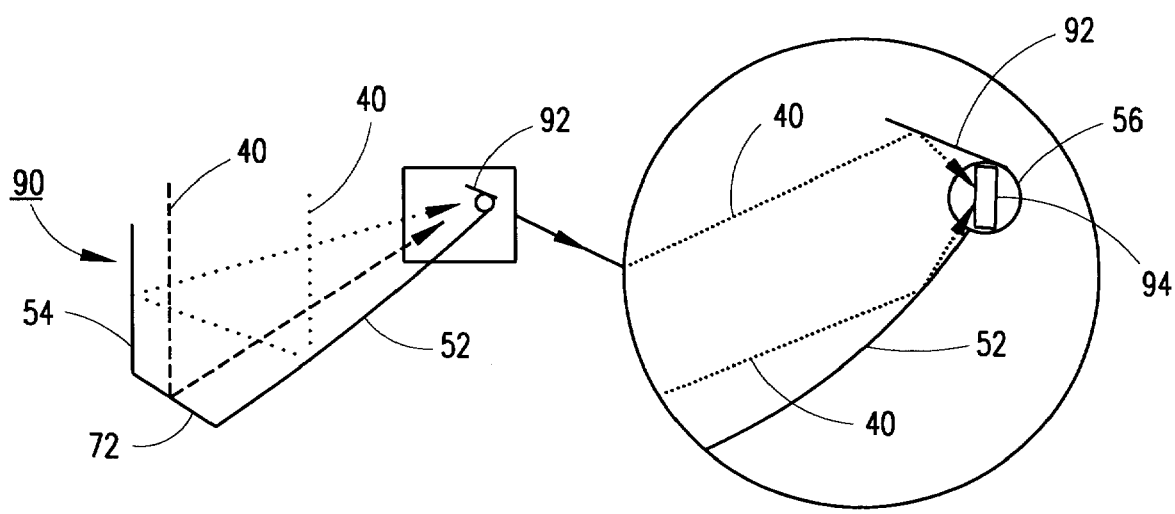
FIG. 9 depicts another exemplary double reflecting solar concentrator with a grazing concentrator.

FIG. 9 depicts another exemplary embodiment of the present invention 90 which includes a grazing concentrator 92 positioned adjacent to the secondary focal point 56. A receiving surface 94 can be positioned at the secondary focal point 56 to collect the solar energy focused there.

The grazing concentrator 92 is substantially flat and at a steep enough angle to reflect the incident light onto the receiving surface (solar cell) 94. The grazing concentrator uses an additional surface 92 and the original primary reflector 52 which allows for incident light 40, that is slightly out of focus, to be reflected back toward the secondary focal point (line) 56. This feature allows for a lower tolerance pointing system for the solar concentrator. Thus, a more expensive and more accurate solar concentrator pointing system may not be required with the present exemplary embodiment of the present invention. Furthermore, this embodiment 90 may be better able to collect diffused or stray light found on partly hazy or lightly cloudy days. The grazing concentrator 92 helps a receiver, collector or PV 94 collect rays that are slightly off focus.

Figure 10:
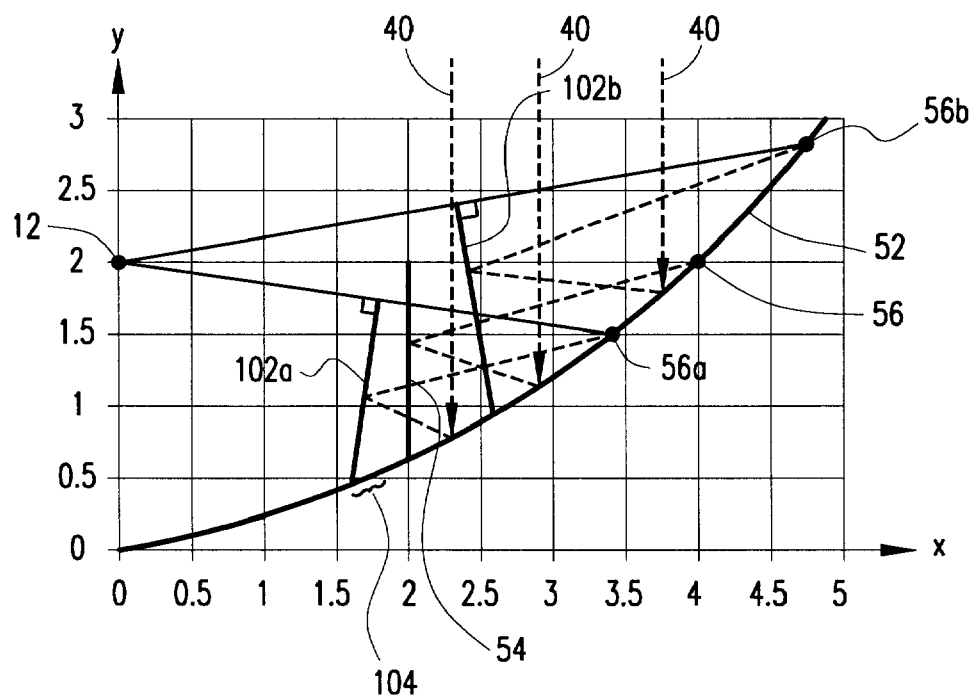
FIG. 10 depicts exemplary "open" and "closed" configurations of exemplary double reflecting solar concentrators.

Other embodiments of the present double reflecting solar concentrator can be utilized to move the secondary focal point to other positions on or near the primary parabolic surface. FIG. 10 depicts two embodiments of the present invention wherein the secondary reflective surface is not perpendicular with the directrix of the parabolic surface or parallel with the Y-axis. The spacing, from the focal point 12, of the secondary reflective surface 102a, 102b may also change. The combination of the non-parallel (canted) and moved secondary reflective surfaces 102a, 102b move the secondary focus 56a, 56b to other locations that may be more useful than the original secondary focus 56. Canting the secondary focus 102a may result in a portion of the primary surface being shadowed 104 by the canted secondary surface 102a and result in an inefficiency of the resulting exemplary solar concentrator.

Figure 11:
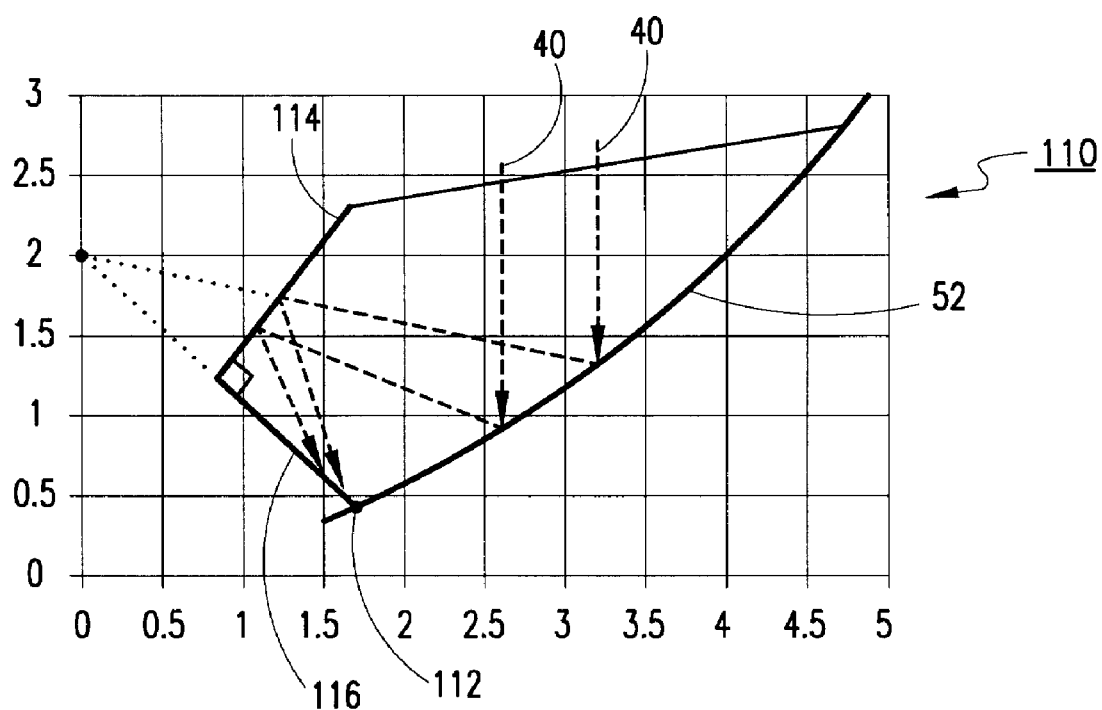
FIG. 11 depicts various exemplary double reflecting solar concentrators which place the focal line of the concentrator near the bottom of the parabolic section.

FIG. 11 depicts an exemplary embodiment of the present double reflecting solar concentrator 110 wherein the secondary focus 112 is at the bottom of solar concentrator 110. Here the incident light 40 reflects first off the primary reflective surface 52 toward the secondary surface 114. The secondary surface 114 is held in place by a support surface or leg 16. The surface 114 is positioned such that it does not cast a shadow on the primary surface 52 by interfering with incident light 40. The secondary surface 114 reflects the incident light to the secondary focal point 112 at the bottom of the solar concentrator trough 110.

Figure 12:
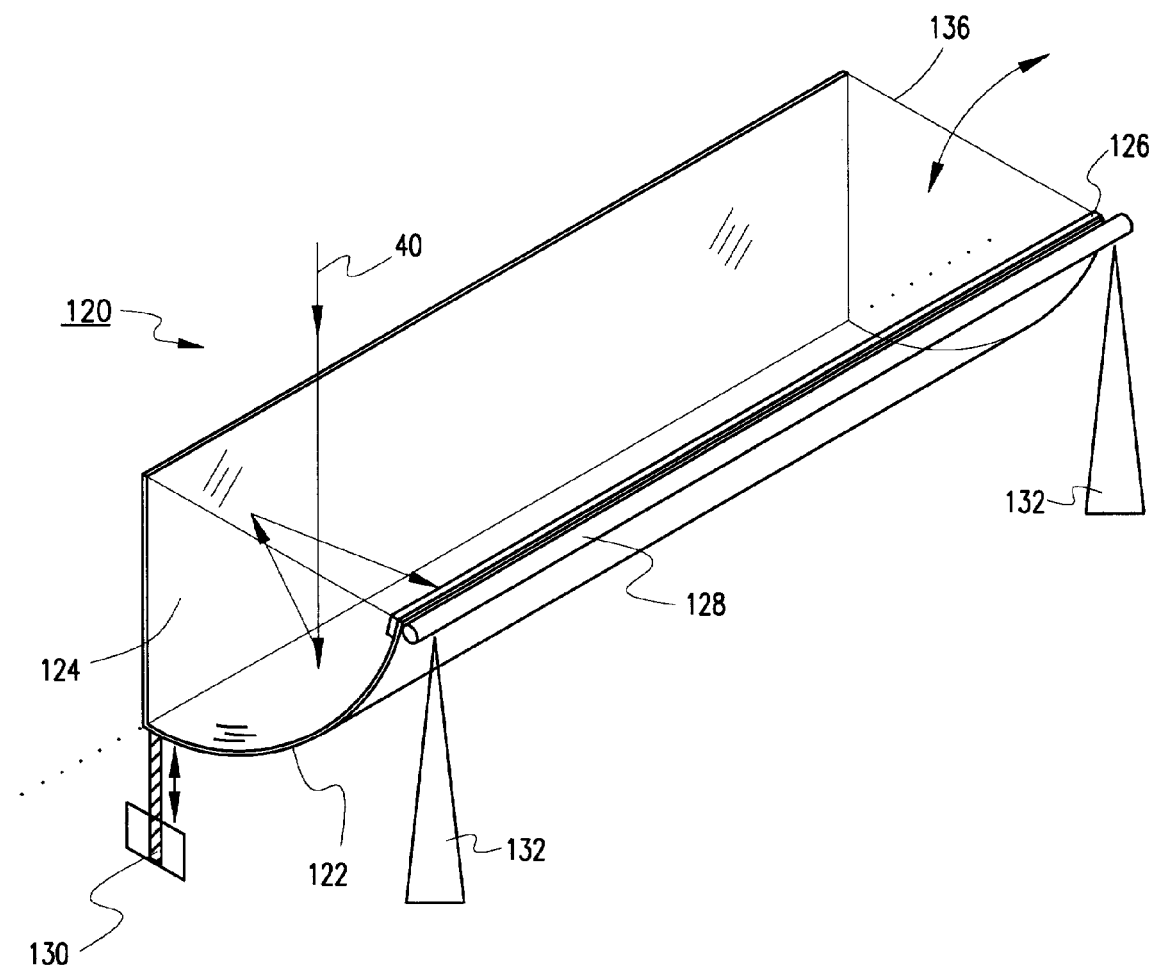
FIG. 12 depicts a three-dimensional view of an exemplary double reflecting solar concentrator mounted on a support structure.

FIG. 12 depicts an exemplary solar concentrator 120 in accordance with the present invention. Incident light 40 reflects off the primary reflective surface 122 toward the secondary reflective surface 124 and then toward a solar collector 126 located at the focal line (also 126) of the exemplary double reflecting solar concentrator 120. The solar 126 collector can be a photo voltaic or other solar energy collection device. A cooling system can be installed along or adjacent to the focal line 126. The cooling system can be a fluid pipe which carries a cooling fluid such as water, propylene glycol, antifreeze or any other acceptable fluid.

A support structure supports and aims the exemplary solar concentrator toward the sun such that incident rays 40 are substantially perpendicular with the directrix of the parabolic surface 122. The preferred support structure rotates the solar concentrator 120 substantially about the focal line 126. A screw jack, cam or hydraulic system 130 may raise and lower the exemplary solar concentrator such that it rotates substantially about the focal line 126 wherein the concentrator is rotably supported by support elements 132.

Since the solar concentrator rotates substantially about the concentrator's focal point the cooling system does not require flexible plumbing. Furthermore, the collector (PV) 126 may be mounted directly to the support structure at the focal line of the exemplary solar concentrator 120.

Some advantages of the present exemplary embodiments are that the concentrator's trough shape has a natural torsion stiffness which is greater than that of a plane parabolic surface. Ribs or other stiffening elements can be added to the structure to further stiffen the structure. A clear cover 136 can be placed over the top of the exemplary solar concentrator to increase the stiffness of the apparatus and further help keep the reflective surfaces clean. The resulting exemplary double reflecting solar concentrator is relatively low in overall height when compared to prior art linear solar concentrators.

To manufacture an exemplary double reflecting solar concentrator the parabolic primary surface can be rolled or formed. The secondary reflective surface is planar and can be formed from the same piece of metal as the primary surface by being folded at the lower corner.

The fixed receiver and plumbing provide additional manufacturing and operating cost savings. As the sun changes position throughout the day or year the exemplary solar concentrator must move so that the sun rays are always incident on the concentrator at the same angle. The exemplary solar concentrator rotates substantially about the focal line of the concentrator. The focal line can be just off the rotational axis. Thus, the solar collectors (PV's) may be fixed on or near the surface of the primary reflective surface along the focal line. Furthermore, the plumbing which cools the solar collectors may flow through or near the fixed rotational axis of solar collector thereby eliminating a need for flexible plumbing.

Although various preferred embodiments of the present double reflecting solar concentrator have been shown and described, it will be appreciated by those skilled in the art that changes may be made to these embodiments without departing from the principles and the spirit of the invention, the scope of which is defined in the appended claims.

What is claimed is:

1. A solar concentrator comprising:

a parabolic surface being substantially covered with a primary reflective surface, said parabolic surface having a cross section of a portion of a parabolic curve and having a focal line coinciding with a focal point of said parabolic curve parallel to a length of said parabolic surface;

a planar surface being substantially covered with a secondary reflective surface, said planar surface being positioned between said focal line and said parabolic surface such that light incident on said primary reflective surface is reflected toward said secondary reflective surface and then focused on a secondary focal line substantially on said parabolic surface.

2. The solar concentrator of claim 1, wherein said portion of said parabolic curve includes a portion of the curve between the vertex and a point at an intersection of the curve and line perpendicular to the axis and passing through the focal point.

3. The solar concentrator of claim 2, wherein said planar surface is positioned substantially equidistant between said focal line and said secondary focal line.

4. The solar concentrator of claim 1, wherein said planar surface is positioned to be perpendicular to a directrix line associated with said parabolic curve.

5. The solar concentrator of claim 1, further comprising a support system for supporting said solar concentrator, said support system attached to said solar concentrator such that said solar concentrator can rotate substantially about said focal line of said parabolic surface.

6. The solar concentrator of claim 1, further comprising a support system for rotating said solar concentrator about an axis, said axis being parallel with and substantially near to said secondary focal line.

7. The solar concentrator of claim 1, further comprising a grazing concentrator positioned parallel with and substantially near said secondary focal line, said grazing concentrator being for reflecting light that is slightly off focus toward said secondary focal line.

8. The solar concentrator of claim 1, further comprising a second parabolic surface positioned between said parabolic curve and said planar surface, said second parabolic surface having a focal point that is located substantially on said secondary focal line.

9. The solar concentrator of claim 1, wherein a solar receiver is positioned substantially on said secondary focal line.

10. The solar concentrator of claim 1, wherein a cooling system is positioned substantially near said secondary focal line.

11. A trough double reflecting solar concentrator comprising:

a primary reflective surface, said primary reflective surface being a portion of a parabolic surface having an associated focal line and a directrix plane;

a secondary reflective surface, said secondary reflective surface being planar and positioned between said focal line and said primary reflective surface such that incident light reflected off said primary reflective surface toward said focal line is reflected off said secondary reflective surface to a secondary focal line substantially on said parabolic surface.

12. The trough double reflecting solar concentrator of claim 11, wherein said primary reflective surface and said secondary reflective surface are connected.

13. The trough double reflecting solar concentrator of claim 11, wherein said secondary reflective surface is substantially perpendicular to said directrix plane.

14. The trough double reflecting solar concentrator of claim 11, wherein said secondary reflective surface is positioned such that a line on the planar surface of said secondary reflector is both parallel with said focal line and equidistant from said focal line and said secondary focal line.

15. The trough double reflecting solar concentrator of claim 11, further comprising a second reflective parabolic surface between said primary reflective surface and said secondary reflective surface, said second parabolic reflective surface having a focus at substantially the same place as said secondary focal line.

16. The trough double reflecting solar concentrator of claim 11, further comprising a solar collector positioned at said secondary focal line.

17. The trough double reflecting solar concentrator of claim 11, further comprising a support structure which allows said trough double reflecting solar concentrator to rotate about and axis that is substantially near and parallel with said secondary focal line.

18. The trough double reflecting solar concentrator of claim 11, further comprising a clear cover through which impinging light may pass prior to contacting said primary reflective surface.

* * * * *